June 26, 1951     H. J. HANSEN ET AL     2,558,553
SPLICE AND METHOD OF MAKING SAME
Filed Sept. 30, 1949     6 Sheets-Sheet 1
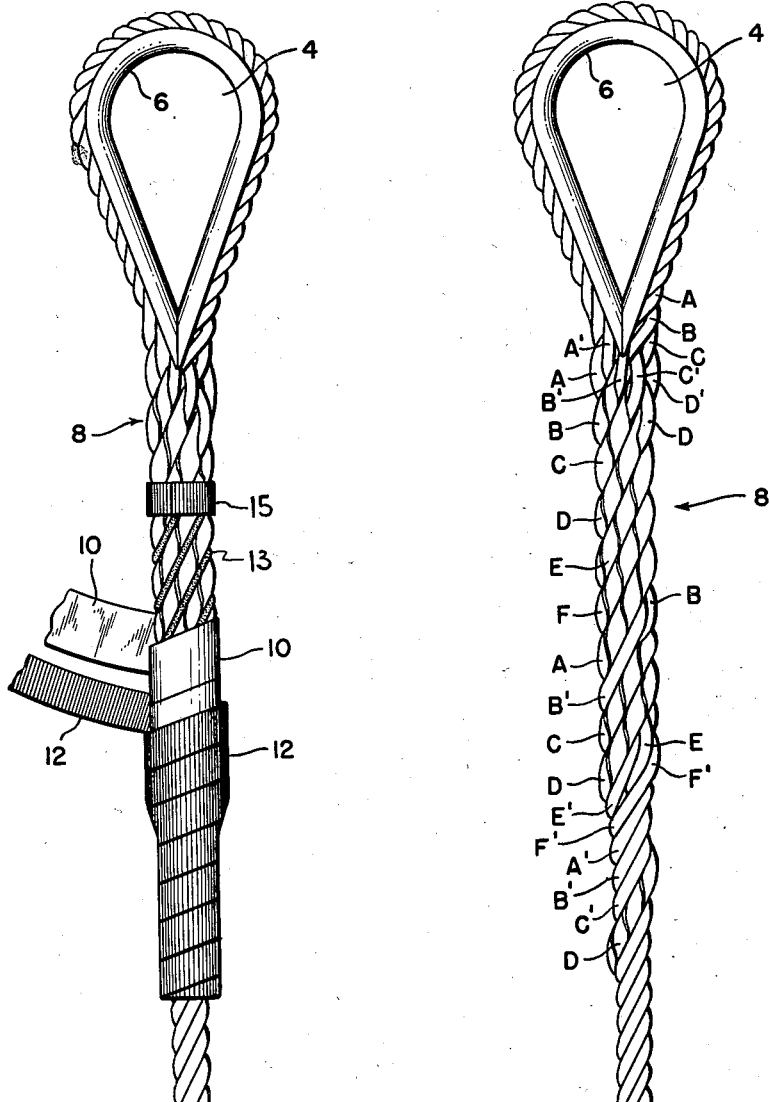
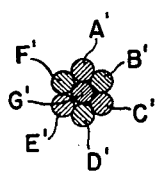
INVENTORS,
HARRY J. HANSEN
& DAVID S. ROBBINS
BY Donald G. Dalton
ATTORNEY

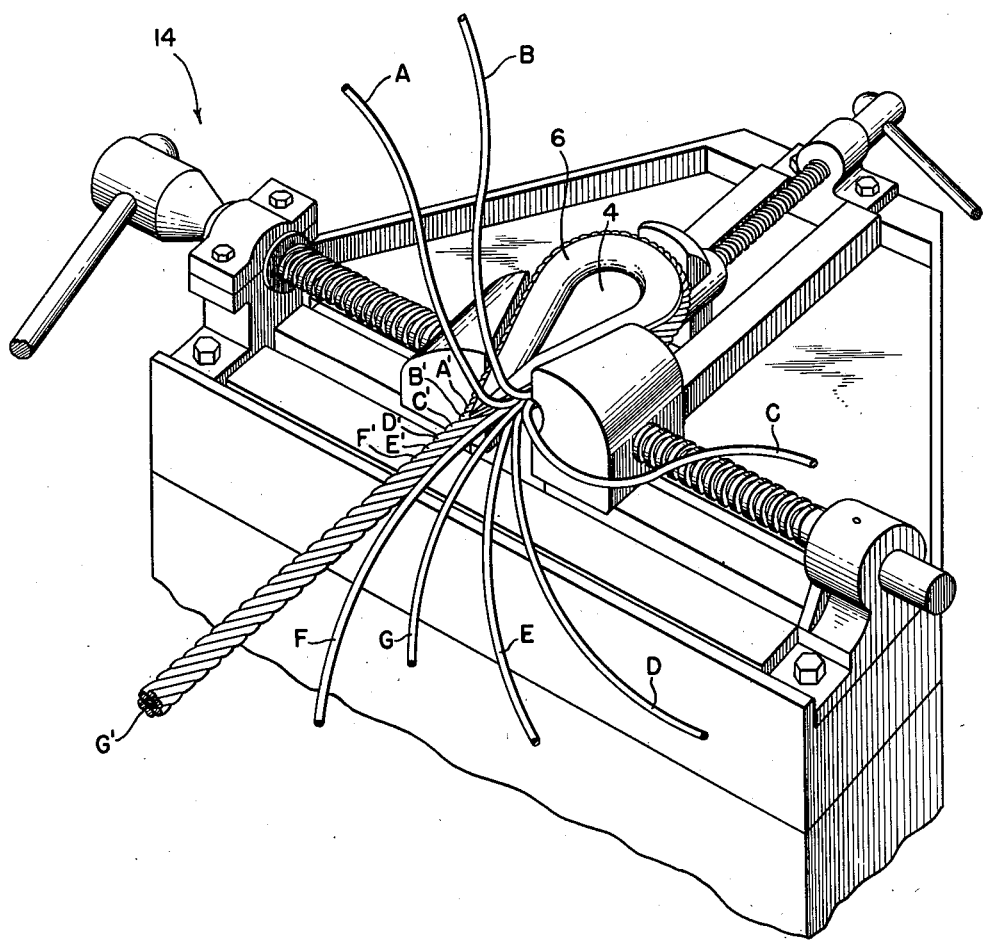

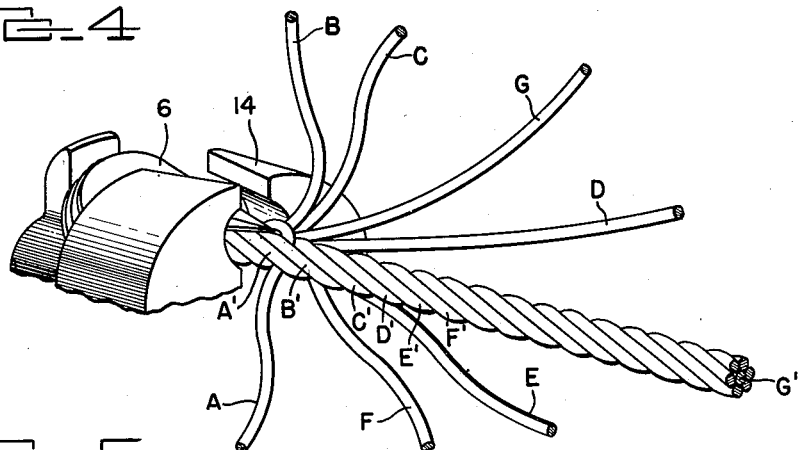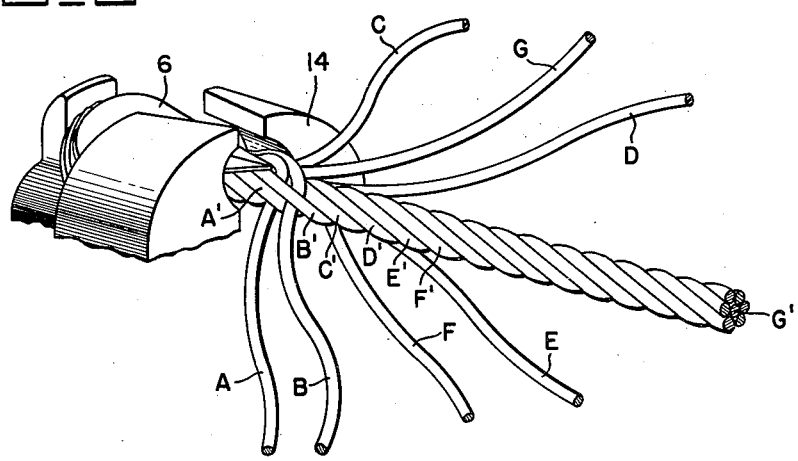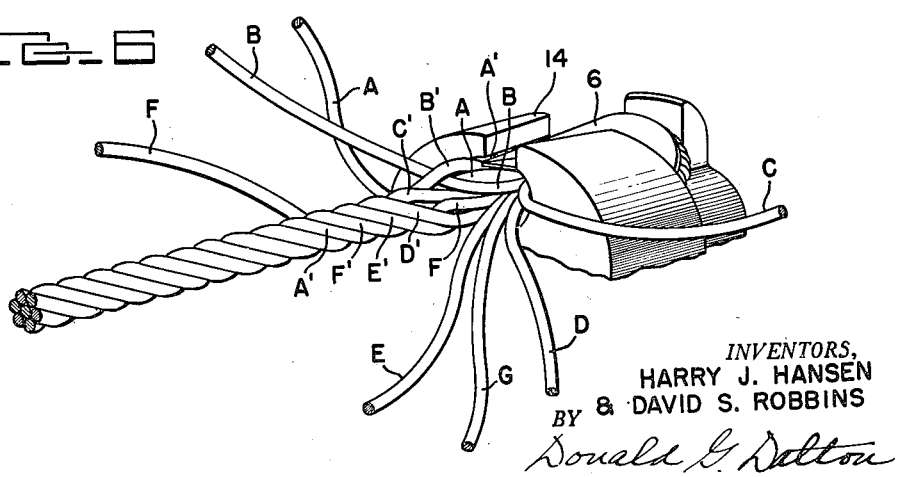

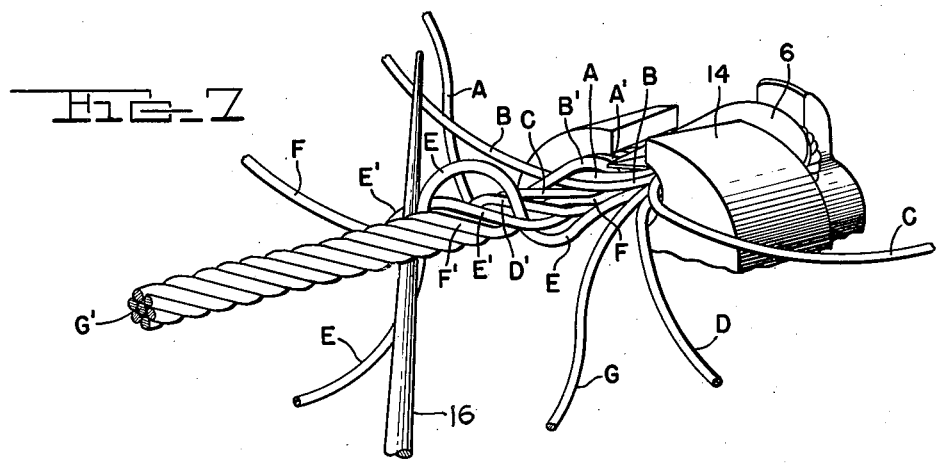
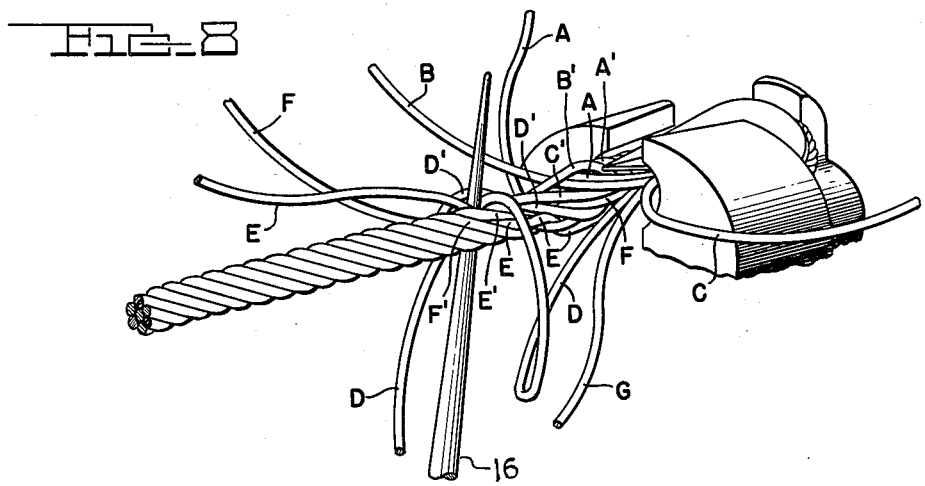
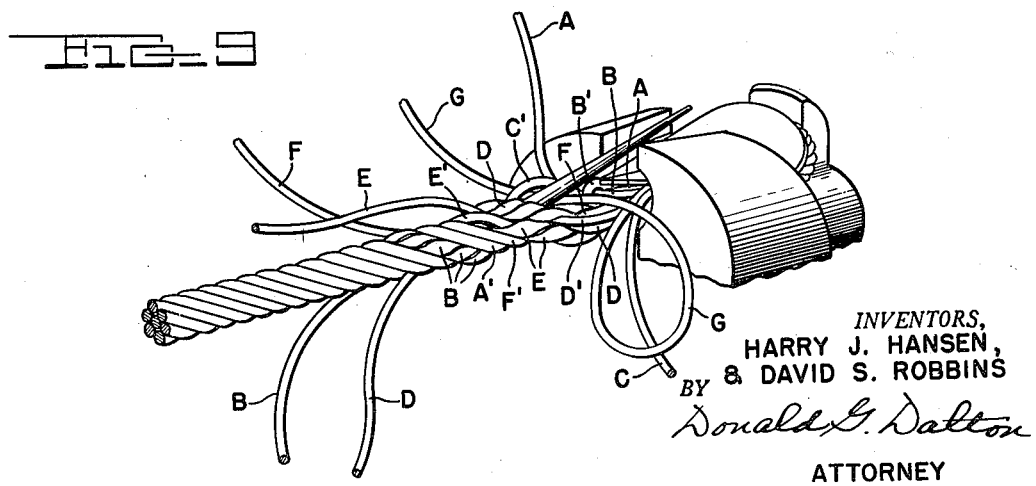

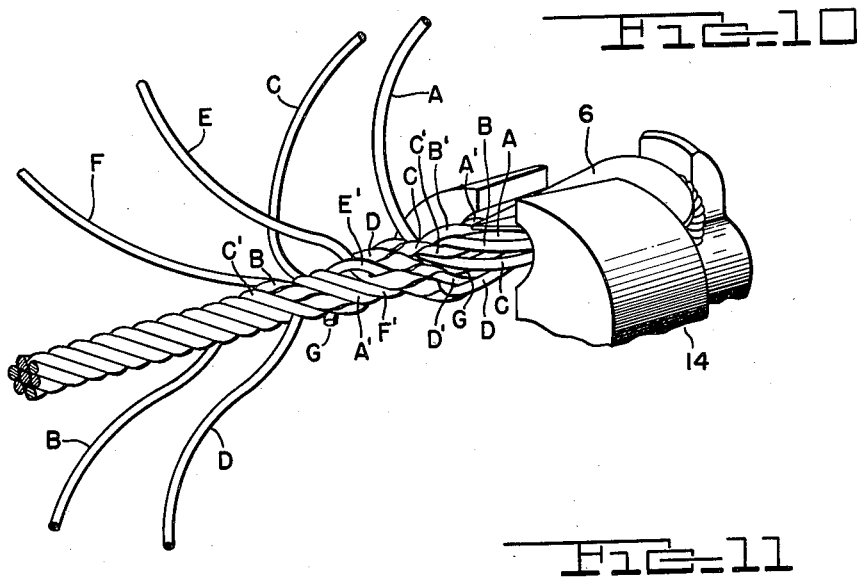
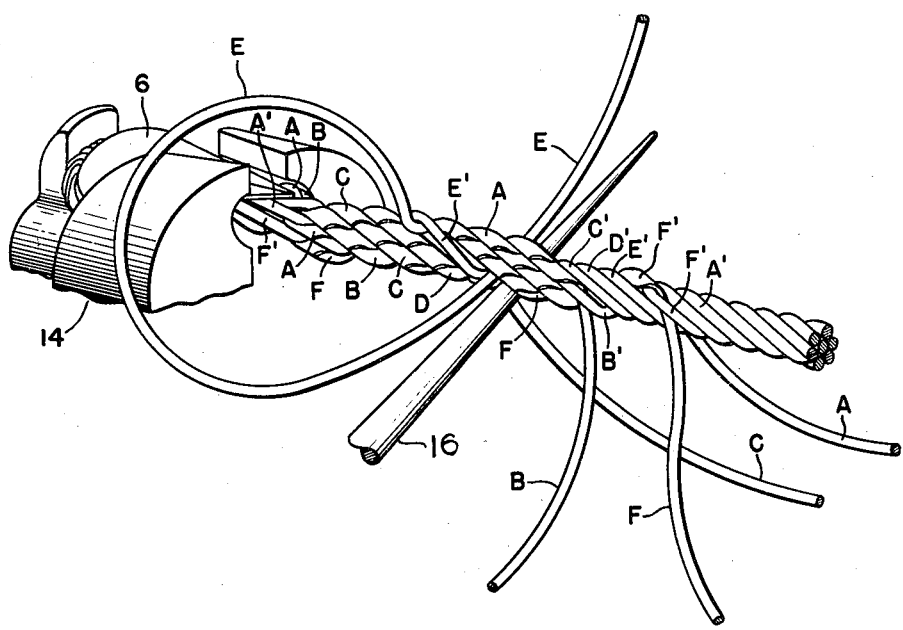

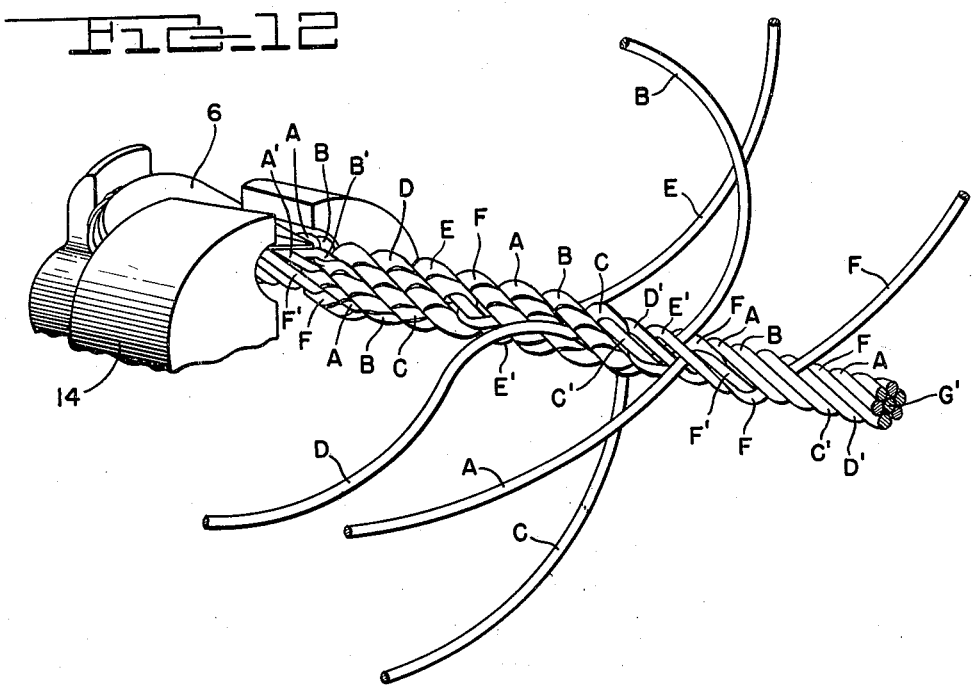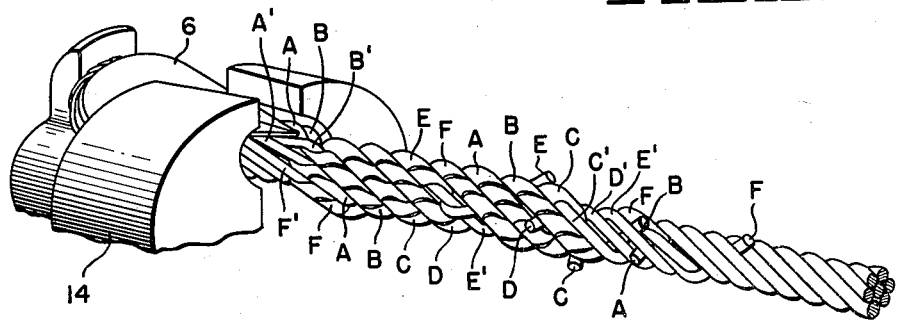

Patented June 26, 1951

2,558,553

UNITED STATES PATENT OFFICE 2,558,553

SPLICE AND METHOD OF MAKING SAME

Harry J. Hansen and David S. Robbins, Hamden, Conn., assignors to The American Steel and Wire Company of New Jersey, a corporation of New Jersey Application September 30, 1949, Serial No. 118,862

10 Claims. (Cl. 57—142)

This invention relates to a splice and more particularly to a splice for use in wire rope slings. Such splices are ordinarily made by bending the rope around the thimble and splicing the short end thereof into the main body. This is done by spreading the short end of the rope and then tucking the ends of the individual strands under similar strands of the long end of the rope. Ordinarily four or five tucks are used for each strand. The protruding ends of the strands are cut off close to the rope and the splice is wrapped with serving wire. The splice described above is bulky and considerably stiffer than the other portion of the sling. Furthermore, the serving wire, while giving some protection to the hands of the workman, does not fully protect the workman's hands from injury.

It is therefore an object of our invention to provide a flexible splice which will not damage the hands of the workman who handles it.

This and other objects will be more apparent after referring to the following specification and attached drawings, in which:

Figure 1 shows the splice as applied to a sling;

Figure 2 is a sectional view taken on the line II—II of Figure 1;

Figure 3 shows the wire rope in a clamp ready for splicing; and

Figures 4 to 13, inclusive, show various stages in the splicing operation.

Referring more particularly to the drawings, the reference numeral 2 indicates the body of a sling having an eye 4 at each end thereof. Each eye portion receives a thimble 6. A splice 8, which is preferably constructed in the manner hereinafter described, joins the free ends of the rope into the body portion 2. To prevent injury to the hand, each splice is wrapped first with cloth tape 10 and then rubber tape 12. The cloth 10 prevents the lubricant in the wire rope from coming in contact with the rubber tape 12. In case galvanized rope is used the cloth 10 may be omitted. To provide a smooth surface of the wrappings on large size ropes, hemp rope 13 is wound in between the strands and secured at each end with friction tape 15. The rubber tape 12 is made of raw or semi-cured rubber and is preferably of the type known as electricians' rubber tape. This rubber tape is wound around the wire rope with adjacent convolutions overlapping as shown in Figure 1. After the rubber tape is wound around the splice it is wiped with a vulcanizing agent such as carbon tetrachloride so as to cause the convolutions to closely adhere to one another.

The splice is preferably made as follows:

A short end of the wire rope 2 is bent around the thimble 6 and the rope and thimble are placed securely in a vise 14. The seizings are removed from the short end of the rope and the strands are separated as shown in Figure 3. In the drawings, the strands of the long end of the rope are designated A' to G', inclusive, and the strands of the short end are designated A to G, inclusive. Strands A to G are continuations of strands A' to G', respectively. For the purpose of clarity the strands are shown as made of one wire, but it will be understood that in actual practice, the strands are generally made up of a plurality of individual wires. A marlinespike 16 is inserted under the first two strands A' and B' of the long end of the rope and strand A is inserted through the opening so formed (see Figure 4). Strand A is then pulled up tight to finish the tuck. The marlinespike is then inserted under the single strand B' and strand B is tucked under strand B' (Figure 5).

The marlinespike is next inserted under strands D' and E' and strand F is tucked under both of these by inserting it through the opening in the direction opposite to which strands A and B were tucked. Figure 6 shows the splice at this point. The marlinespike is then inserted under strand E' and strand E is given one tuck thereunder in the same manner as strand B was tucked. Without removing the marlinespike, strand E is given a second tuck by winding it spirally around strand E' one more time (see Figure 7).

Strand D is next tucked once under strand D' (see Figure 8). Without removing the spike, strand D is given two more tucks by winding it spirally around strand D'. Strand B, which has already been given one tuck, is then given four more tucks by winding it spirally around strand B'. Following this operation, center strand G is tucked under strand C'. Figure 9 shows the splice in this position. The following tucks have been made at this point: strand A, one tuck under strands A' and B'; strand B, five tucks under strand B'; strand F, one tuck under strands D' and E'; strand E, two tucks under strand E'; strand D, one tuck under strand D'; and center strand G, three tucks under strand C'.

Strand C is then given two tucks under strand C' and center strand G, which had previously also been tucked under C', is cut off (see Figure 10).

Strand C is next given two more tucks around strand C'; strand A is given five more tucks around strand A'; and strand F is given six more tucks around F'' by winding spirally as described for strand E.

At this time all the strands (except G which was cut off) are tucked in ready to be tucked over one and under three. Strand E is first tucked over strand E' and under strands F'', A', and B' (see Figure 11). The balance of the strands are then tucked over one and under three in the following sequence: strand D, tucked over D' and under E', F'' and A'; strand C, tucked over C' and under D', E' and F''; strand B, tucked over B' and under C'', D' and E'; strand A, tucked over A' and under B', C' and D'; strand F, tucked over F'' and under A', B' and C'. Figure 12 shows the splice at this point of its manufacture.

The strands are next cut off with a torch with their cut ends extending slightly (see Figure 13). The splice is then hammered down with a wooden mallet and the cut ends are pressed into the center of the splice (this being illustrated in Figure 1). It will be seen that strand E, in addition to the final tuck, will have two tucks and that strands D, C, B, A and F will have three, four, five, six and seven tucks, respectively. Because the amount of rope in the splice decreases from the eye portion to the end of the splice, the splice is tapered and flexible.

While I have illustrated a splice made in a rope having six strands, the splice can be made in an eight strand rope in a similar manner in which case the number of tucks in the individual strands will vary from two to nine instead of two to seven as in a six strand rope. Regardless of the number of strands in the rope the least number of tucks given any of the strands would be two in addition to the final tuck under three strands and the greatest number of tucks will be one more than the number of strands.

It will be understood that the described splice is illustrative of the invention and that it is possible to deviate from the description somewhat and still remain within the scope of the following claims.

We claim:

1. A splice for fastening an end of a rope into another portion of rope comprising a plurality of strands in said end of the rope tucked around the strands of the said other portion of rope, the strands in the end of the rope and in the other rope portion being equal in number, the number of tucks in the individual strands varying from two to one plus the number of strands in the rope, and an additional tuck at the end of each strand taken over one and under three strands of the other rope portion.

2. A splice according to claim 1 in which rubber tape is wound around the splice with adjacent convolutions of the tape overlapping.

3. A splice for fastening an end of a six strand rope into another portion of similar rope comprising six strands in said end of the rope tucked around the strands of the said other portion of rope, the number of tucks in the individual strands varying from two to seven, and an additional tuck at the end of each strand taken over one and under three strands of the other rope portion.

4. A splice according to claim 3 in which rubber tape is wound around the splice with adjacent convolutions of the tape overlapping.

5. A wire rope sling having an eye at the end thereof formed by bending the end of the wire rope into an eye shape and fastening the free end of the rope into the main portion thereof comprising a plurality of strands in the free end of the rope tucked around the strands of the main portion thereof, the number of tucks in the individual strands varying from two to one plus the number of strands in the rope, and an additional tuck at the end of each strand taken over one and under three strands of the main rope portion.

6. A wire rope sling according to claim 5 in which rubber tape is wound around the splice with adjacent convolutions of the tape overlapping.

7. A six strand wire rope sling having an eye at the end thereof formed by bending the end of the wire rope into an eye shape and fastening the free end of the rope into the main portion thereof comprising six strands in the free end of the rope tucked around the strands of the main portion thereof, the number of tucks in the individual strands varying from two to seven, and an additional tuck at the end of each strand taken over one and under three strands of the main rope portion.

8. A wire rope sling according to claim 7 in which rubber tape is wound around the splice with adjacent convolutions of the tape overlapping.

9. The method of making a wire rope sling which comprises bending the end of the wire rope into an eye shape and fastening the free end of the rope into the main portion thereof by tucking the strands of the end of the rope around the strands of the main portion, the number of tucks varying from two to one plus the number of strands in the rope, and then taking an additional tuck at the end of each strand over one and under three strands of the main portion.

10. The method of making a wire rope sling according to claim 9 in which rubber tape is then wound around the splice with adjacent convolutions of the tape overlapping and the wound tape is wiped with a vulcanizing agent.

HARRY J. HANSEN.
DAVID S. ROBBINS.

REFERENCES CITED

The following references are of record in the file of this patent:

"Splicing Wire and Fibre Rope," Granmont & Hensel, Cornell Maritime Press, New York, 1945.